(12) United States Patent
Osborne et al.

(10) Patent No.: US 11,384,689 B2
(45) Date of Patent: Jul. 12, 2022

(54) SHIELDING ASSEMBLY FOR DEBRIS MANAGEMENT

(71) Applicant: CNH Industrial America LLC, New Holland, PA (US)

(72) Inventors: Don Osborne, Quarryville, PA (US); Anthony Diederich, Jr., Terre Hill, PA (US); Mary Sullivan, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/509,488

(22) Filed: Oct. 25, 2021

(65) Prior Publication Data

US 2022/0042457 A1 Feb. 10, 2022

Related U.S. Application Data

(62) Division of application No. 16/023,543, filed on Jun. 29, 2018, now Pat. No. 11,156,160.

(51) Int. Cl.
| | |
|---|---|
| *F01P 5/06* | (2006.01) |
| *F02C 7/055* | (2006.01) |
| *F02M 35/16* | (2006.01) |
| *A01D 85/00* | (2006.01) |
| *B60K 11/06* | (2006.01) |
| *F01P 1/00* | (2006.01) |

(52) U.S. Cl.
CPC .............. *F02C 7/055* (2013.01); *F01P 5/06* (2013.01); *F02M 35/161* (2013.01); *A01D 2085/007* (2013.01); *B60K 11/06* (2013.01); *B60Y 2200/22* (2013.01); *F01P 2001/005* (2013.01)

(58) Field of Classification Search
CPC ....... F02C 7/055; F01P 5/06; F01P 2001/005; F01P 11/12; F02M 35/161; A01D 2085/007; A01D 85/005; B60K 11/06; B60Y 2200/22; B60Y 2200/221; B60Y 2200/222; B60Y 2200/223
See application file for complete search history.

(56) References Cited

U.S. PATENT DOCUMENTS

| | | | |
|---|---|---|---|
| 3,093,361 A | 6/1963 | Hooker et al. | |
| 4,339,014 A | 7/1982 | Berth et al. | |
| 5,689,953 A * | 11/1997 | Yamashita | ................ F01N 3/05 180/68.1 |
| 5,996,730 A | 12/1999 | Pirchi | |

(Continued)

FOREIGN PATENT DOCUMENTS

| | | |
|---|---|---|
| EP | 443210 | 8/1991 |
| EP | 887524 | 8/2004 |
| FR | 2667549 | 12/1992 |

*Primary Examiner* — Hung Q Nguyen
(74) *Attorney, Agent, or Firm* — Peter Zacharias; Patrick Sheldrake

(57) ABSTRACT

A shield assembly that may be disposed within an engine compartment of an agricultural vehicle, the shield assembly includes a plurality of shields that may block buildup of debris within the engine compartment. At least one shield of the plurality of shields includes a sloped surface that may direct debris away from the engine compartment. The shield assembly also includes a plurality of ducts formed between the plurality of shields. The plurality of ducts may redirect cooling fluid from a cooling fan package to the engine compartment to remove debris from within the engine compartment.

20 Claims, 5 Drawing Sheets

(56) References Cited

U.S. PATENT DOCUMENTS

| | | | |
|---|---|---|---|
| 6,257,359 B1 | 7/2001 | Granlund et al. | |
| 6,510,833 B1 | 1/2003 | Anthon | |
| 7,503,306 B2 | 3/2009 | Knockl et al. | |
| 8,544,582 B2 * | 10/2013 | Kaku | B60K 11/06 180/68.1 |
| 8,919,469 B2 | 12/2014 | Shatters et al. | |
| 8,936,122 B2 | 1/2015 | MacGregor et al. | |
| 9,016,411 B2 | 4/2015 | Nam et al. | |
| 2003/0066209 A1 | 4/2003 | Takezaki et al. | |
| 2005/0211483 A1 * | 9/2005 | Pfohl | F02M 35/10157 180/68.1 |
| 2006/0213708 A1 | 9/2006 | Witwer et al. | |
| 2007/0007061 A1 * | 1/2007 | Meyer | F01P 3/18 180/68.1 |
| 2008/0257531 A1 * | 10/2008 | D'hondt | F01P 11/12 165/104.34 |
| 2010/0071870 A1 | 3/2010 | Kisse | |
| 2015/0068470 A1 | 3/2015 | Tsutsumi et al. | |
| 2016/0193912 A1 | 7/2016 | Minoura et al. | |
| 2016/0298580 A1 | 10/2016 | Lee et al. | |
| 2017/0030263 A1 | 2/2017 | Rowe | |

\* cited by examiner

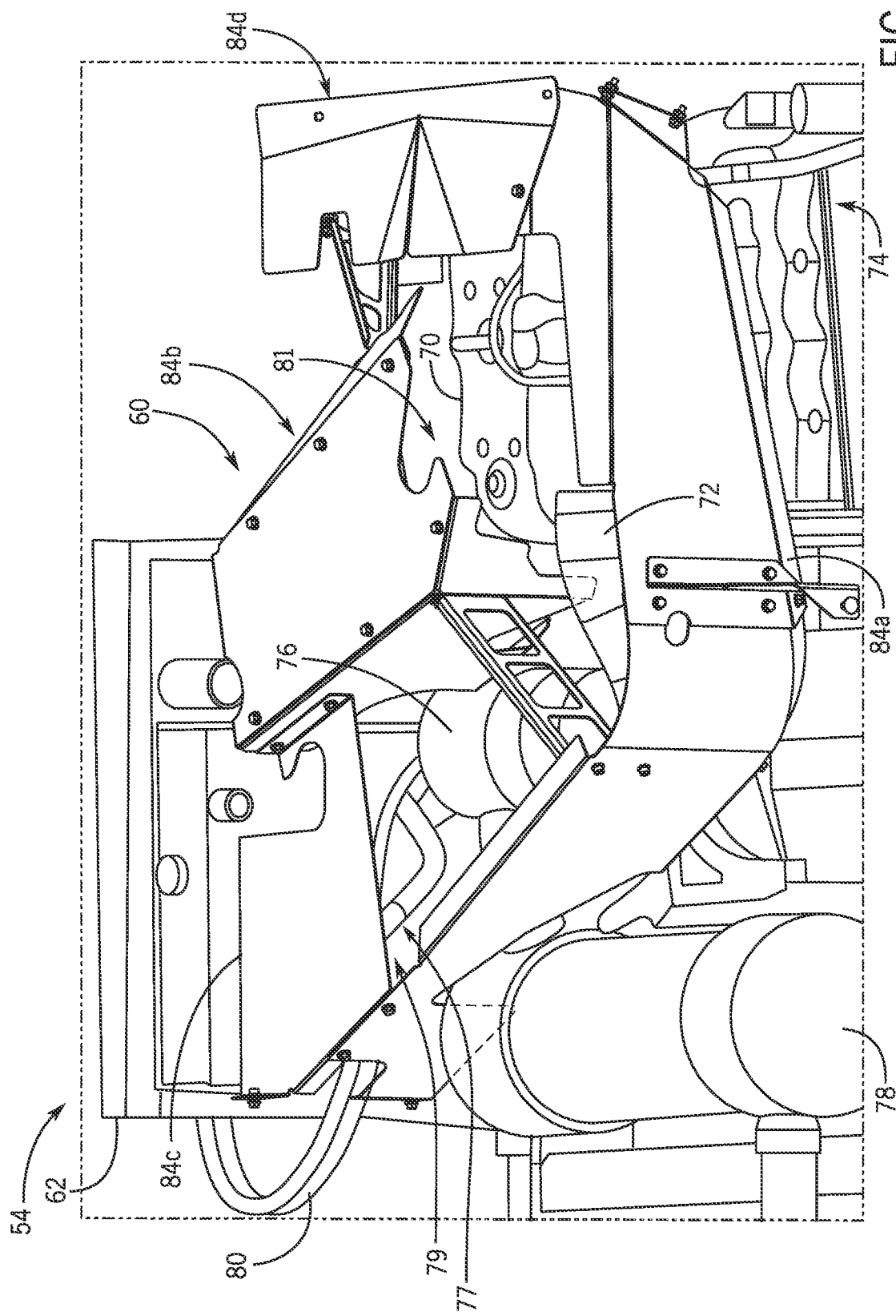

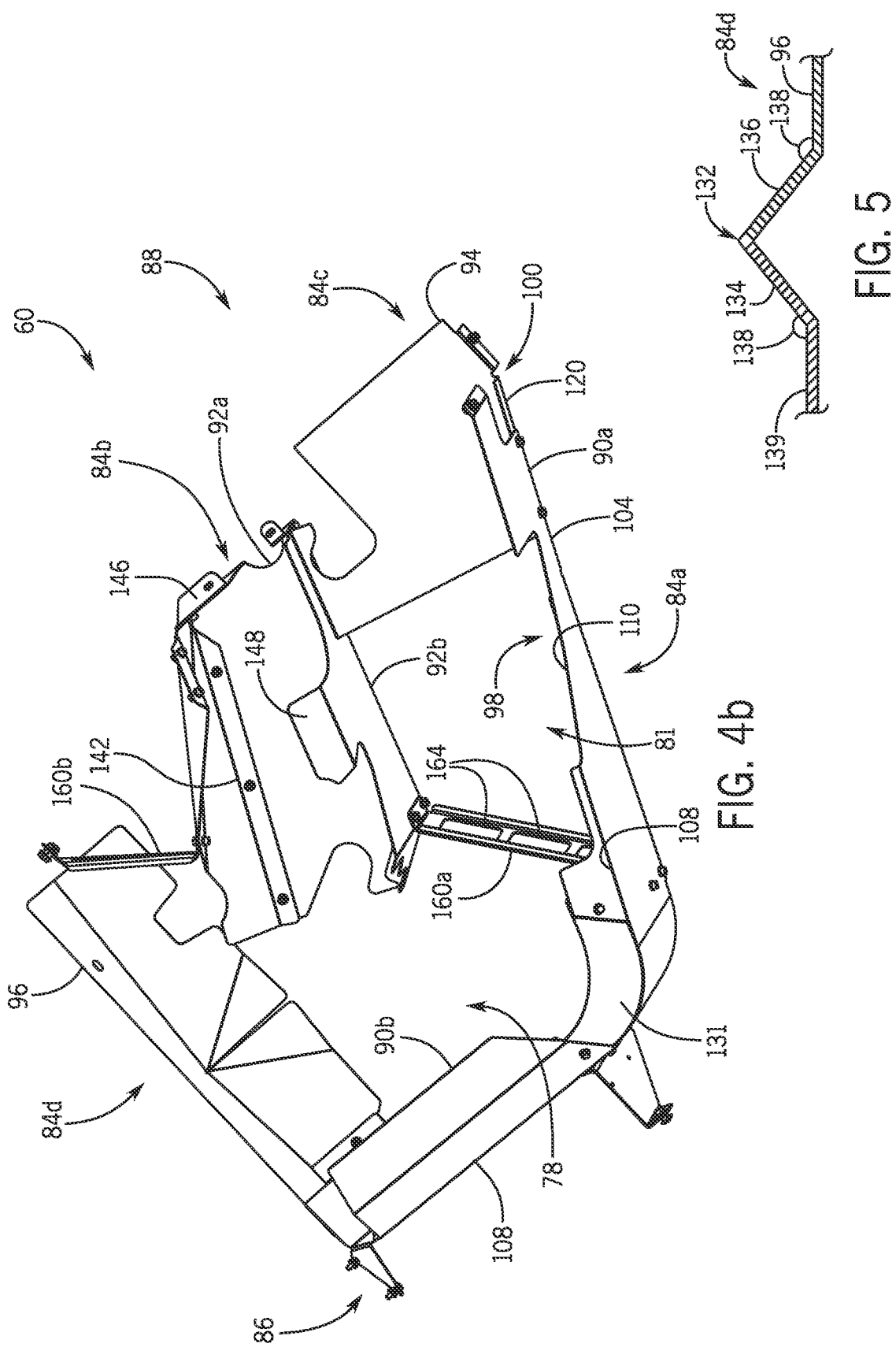

SHIELDING ASSEMBLY FOR DEBRIS MANAGEMENT

CROSS-REFERENCE TO RELATED APPLICATION

The present application is a divisional of U.S. application Ser. No. 16/023,543, entitled "SHIELDING ASSEMBLY FOR DEBRIS MANAGEMENT," filed Jun. 29, 2018, the entirety of which is incorporated by reference herein for all purposes.

BACKGROUND

The present disclosure relates generally to management of debris in agricultural vehicles and, more particularly, to an engine shielding assembly.

Work vehicles, such as bale wagons, are used during crop harvesting to collect bales of crop material. For example, the bale wagons are used to collect bales of hay or other crops that are placed in the field, form the bales into a composite stack on the bale wagon, and subsequently discharge the stack into a storage area. The bale wagons include tables that receive bales picked up from the field, support the bale stacks, and facilitate discharge of the bale stacks into the storage area. For example, the bale wagon includes a first table that receives the bale from a bale loader, or pick up device, mounted on the bale wagon. The first table accumulates a predetermined number of bales, which are arranged in rows having a selected pattern. Once a desired number of bales are accumulated in a row, the first table transfers the row of bales to a second table that accumulates several rows of bale. The second table transfers the rows of bale to a third table, or load bed, which forms the bale stacks and unloads the bale stacks into the storage area. For example, the third table pivots (e.g., 90 degrees) and deposits the bale stacks on a surface (e.g., ground) of the storage area.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

Certain embodiments describe a shield assembly that may be disposed within an engine compartment of an agricultural vehicle, the shield assembly includes a plurality of shields that may block buildup of debris within the engine compartment. At least one shield of the plurality of shields includes a sloped surface that may direct debris away from the engine compartment. The shield assembly also includes a plurality of ducts formed between the plurality of shields. The plurality of ducts may redirect cooling fluid from a cooling fan package to the engine compartment to remove debris from within the engine compartment.

DRAWINGS

These and other features, aspects, and advantages of the present invention will become better understood when the following detailed description is read with reference to the accompanying drawings in which like characters represent like parts throughout the drawings, wherein:

FIG. 3 is a perspective view of an embodiment of the engine compartment of the bale wagon of FIG. 1, the engine compartment includes a shield assembly having shields arranged in a manner that block debris from falling into the engine compartment and that direct cooling fluid to various regions of the engine compartment;

FIG. 4b is a perspective view of a bottom end of the shield assembly of FIG. 3; and FIG. 5 is a cross-sectional side view of an embodiment of a panel forming a shield of the shield assembly of FIG. 3.

DETAILED DESCRIPTION

Figure 1:
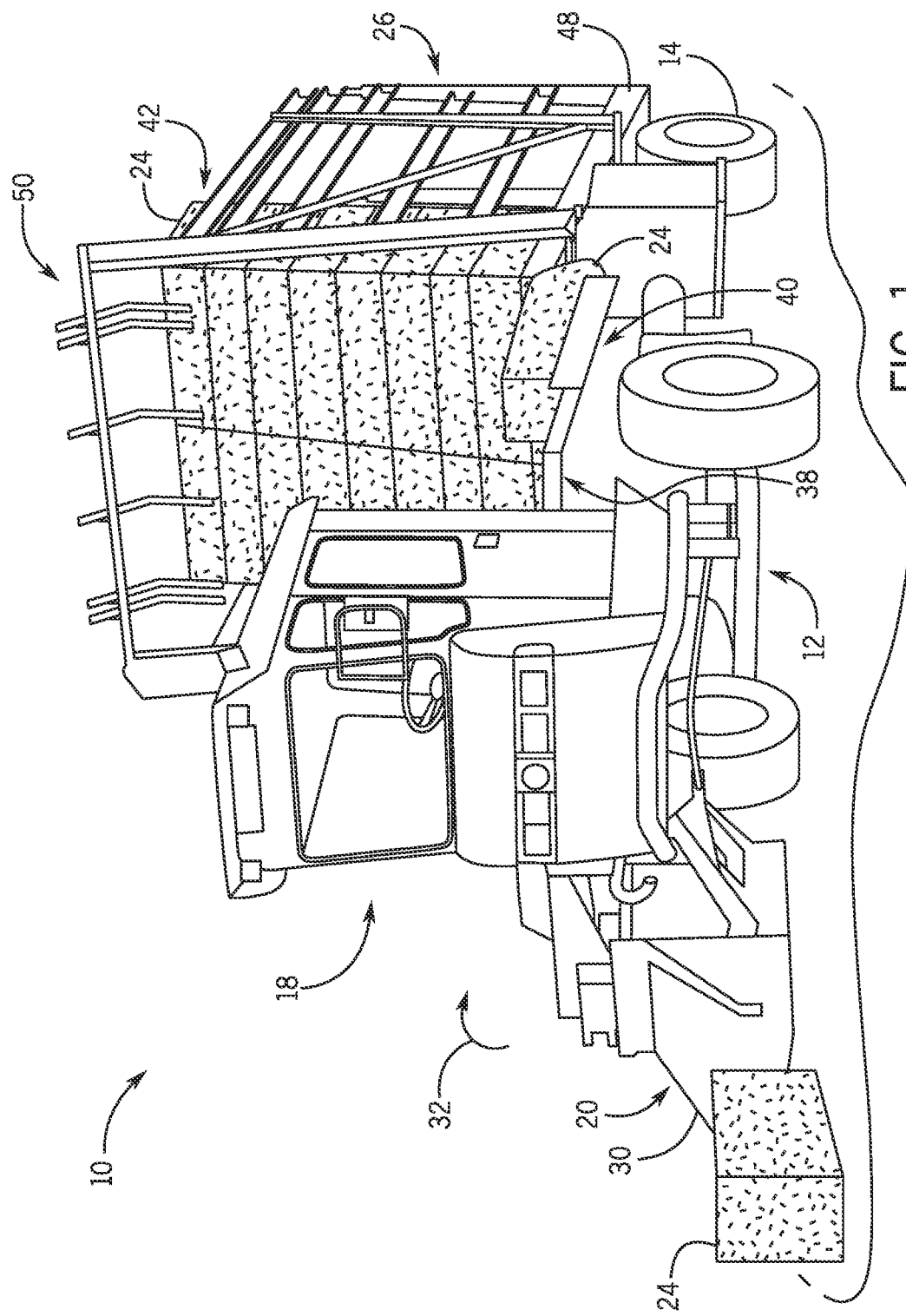
FIG. 1 is a perspective view of an embodiment of a bale wagon that includes a shield assembly within an engine compartment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Bale wagons are used to collect and transport bales from one location to another. For example, during crop harvesting, crop material (e.g., hay) is placed in the field. A baler then collects the material and forms bales. The bale wagons retrieve the bales from the field, form bale stacks, and transport the bale stacks to a storage location. Handling of the bale stacks generally creates debris (e.g., dust and particulates) that may be spread throughout the bale wagon and accumulate in undesirable areas of the bale wagon. For example, the debris may accumulate within the engine compartment of the bale wagon. Accumulation of the debris within the engine compartment may reduce the cooling efficiency on an engine system. For example, the debris may block a coolant (e.g., air) from reaching surfaces of components within the engine compartment. As such, the coolant (e.g., air) may be unable to effectively and efficiently cool the engine compartment. Accordingly, it is presently recognized that it may be desirable to shield the engine compartment of the bale wagon to block spreading and accumulation of the debris created by the collection and transport of the bale stacks. Additionally, the shield may form ducts (e.g., channels) that direct air from a cooling fan throughout the engine compartment to enable displacement of debris before it accumulates within the engine compartment.

As will be described in more detail below, techniques described herein may provide shielding to the engine compartment of the bale wagon to control spreading and accumulation of debris from crop material during handling of bale stacks. For example, one embodiment describes a bale wagon that includes a shield assembly having shields arranged around components of the engine compartment in a manner that directs the debris away from the engine compartment to mitigate accumulation. In addition, the disclosed shield assembly includes ducts created by the shields that may route a fluid (e.g., air) in several paths along the engine compartment to reduce accumulation of debris and facilitate cooling of components within the engine compartment.

With the foregoing in mind, FIG. 1 is a perspective view of an embodiment of a bale wagon 10 that includes a shield assembly for the management of debris generated from handling bales. The bale wagon 10 is discussed in the context of a self-propelled wagon. However, in other embodiments, the bale wagon may be a pull-wagon (e.g., a bale wagon that is towed by a separate tractor or prime mover). The bale wagon 10 includes a mobile chassis 12 having wheels 14, and an operator cab 18. The operator cab 18 includes one or more controls for operating the bale wagon.

The bale wagon also includes a bale loader 20 that partially rotates, or pivots, when actuated to collect bales 24 from a field and to load the bales 24 onto a support 26 of the bale wagon. The bale loader 20 includes an arm 30 that grasps the bale 24 and pivots about an axis in a direction 32 toward the support 26 to deposit the bale onto the support 26. In other embodiments, the bale loader 20 includes a conveyor (e.g., chain conveyor) that transports the bales 24 onto the support 26. In the illustrated embodiment, the support 26 is positioned over the mobile chassis 12 behind the operator cab 18. The support 26 includes tables that are used to support the bales 24, stack the bales 24, and to unload the bale stack. For example, the support 26 includes a first table 38 (e.g., a cross-conveyor) that receives multiple bales 24 from the bale loader 20 and arranges the bales 24 in a row. Once a desired number of bales 24 are deposited onto the first table 38, the first table 38 pivots in the direction 32 and deposits a row of bales 24 onto a second table 40 positioned adjacent to the first table 38. The second table 40 receives and accumulates rows 42 of the bales 24. The second table 40 may receive multiple rows 42 of the bales 24 until a desired number of rows 42 have been deposited. Following accumulation of the rows 42 of the bales 24, the second table 40 pivots in the direction 32 to transfer and deposit the rows 42 of the bales 24 on a third table 48 (e.g., load bed), where the rows 42 of the bales 24 are stacked to form bale stacks 50. The third table 48 may pivot in the direction 32 (e.g., tilt 90 degrees) to unload the bale stacks 50 onto a surface of the desired storage area.

Figure 2:
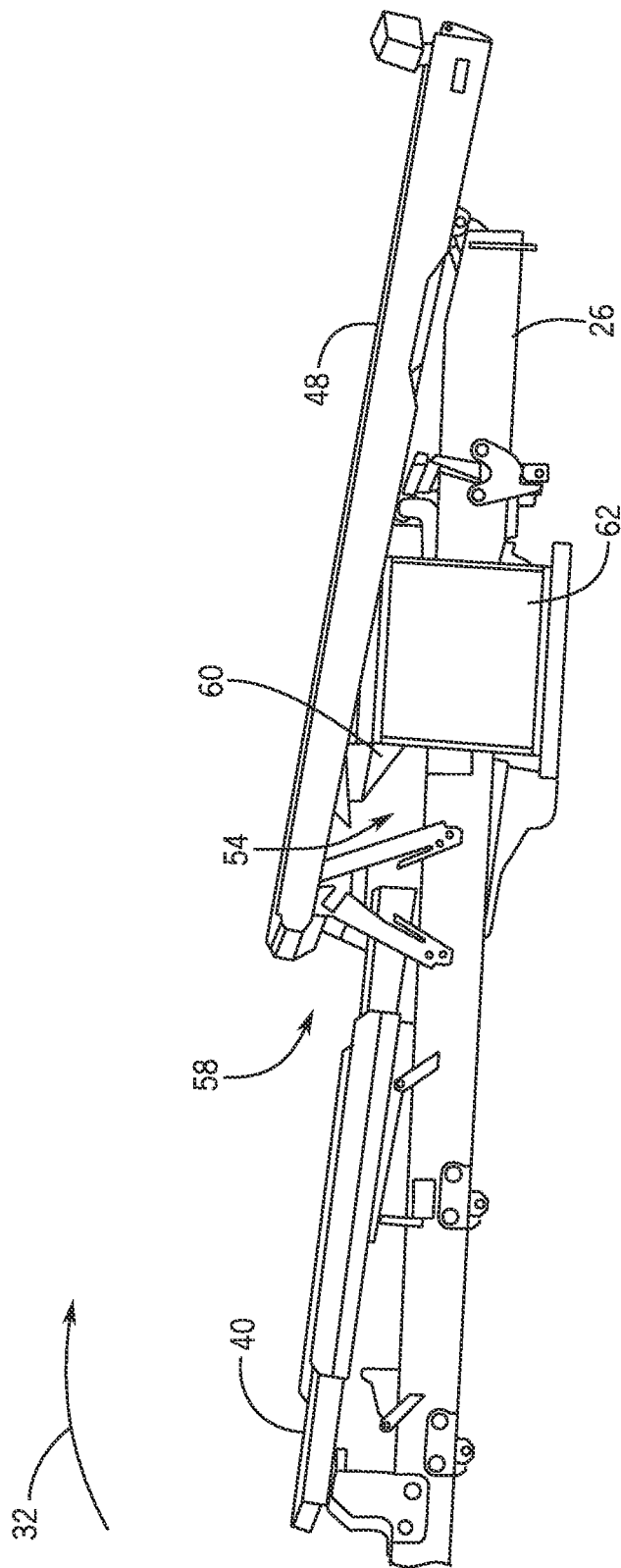
FIG. 2 is a side view of an embodiment of a portion of a mobile chassis of the bale wagon of FIG. 1, the mobile chassis includes a shield assembly within the engine compartment.

Loading, transfer, and accumulation of the bale 24 onto the support 26 of the bale wagon 10 generates debris that may collect within portions of the bale wagon 10. FIG. 2 is a side view of a portion of the support 26. As shown, an engine compartment 54 of the bale wagon is positioned below the third table 48. As such, during transfer of the rows 42 of the bale onto the third table 48, debris from the bales 24 may spread into the engine compartment 54 through a gap 58 between the tables 40, 48 and along a lateral side the support 26. As discussed in further detail below, a shield assembly 60 may be positioned within the engine compartment 54 to block deposition and accumulation of the debris within the engine compartment 54. Additionally, the shield assembly 60 may direct air over/around components of the engine compartment 54 to reduce accumulation of debris. Accordingly, cooling fluid supplied by a cooling package 62 positioned adjacent to the engine compartment 54 (e.g., on a lateral side of the mobile chassis 12) may contact and cool components of the engine compartment 54.

FIG. 3 is a perspective view of an embodiment of the engine compartment 54 of the bale wagon 10 of FIG. 1, including the shield assembly 60. The engine compartment 54 houses an engine 70, an exhaust pipe 72, an exhaust manifold 74, and exhaust systems 76, 78 (e.g., mufflers). The cooling package 62 includes a fan and one or more radiators that supply a coolant (e.g., a liquid coolant) to a hydraulic motor and to the engine 70 via coolant lines 80 to facilitate cooling of the hydraulic motor, the exhaust systems 76, 78 and the engine 70, and in certain embodiments, other components within the engine compartment 54. The cooling package 62 (e.g., the fan of the cooling package) may direct cooling fluid (e.g., air) into the engine compartment 54 for cooling surfaces of the engine 70, the exhaust pipe 72, the exhaust manifold 74, the hydraulic motor, the exhaust systems 76, 78, and any other components of the engine compartment 54.

As discussed above, debris generated during collecting, loading, and transferring of the bales 24 may accumulate within the engine compartment 54. The debris may cover surfaces of the components within the engine compartment 54, which may decrease the cooling efficiency of cooling fluid (e.g., air) supplied to the engine compartment 54. For example, the debris may accumulate on surfaces of the engine 70, the exhaust pipe 72, the manifold 74, the exhaust system 76, 78, and/or the hydraulic motor. It is now recognized that, without the disclosed shield assembly 60, the cooling fluid may be unable to contact and cool surfaces of the engine 70, the manifolds 74, the exhaust system 76, 78, and/or the hydraulic motor. Accordingly, to mitigate deposition and accumulation of the debris, the engine compartment 54 includes the shield assembly 60. The shield assembly 60 includes shields 84 arranged in a manner that blocks accumulation of the debris within the engine compartment 54. In addition, the arrangement of the plurality of shields 84 creates features that distribute the cooling fluid (e.g., air) throughout the engine compartment 54 to remove debris from surfaces of the components and cool the components within the engine compartment 54.

As discussed in further detail below, a speed of a cooling fan of the cooling package 62 may be varied based on movement of the tables 38, 40, 48. For example, a speed of the fan may be increased during times when the bale 24 is transferred between the tables 38, 30, 48 and debris is falling from the tables 38, 40, 40. The increased fan speed increases fluid flow within the engine compartment and the shield assembly 60 directs air through the engine compartment 54 to displace debris before accumulation on surface of the components within the engine compartment, thereby reducing accumulation of debris within the engine compartment. Conversely, when the deposition of debris is unlikely or minimal (e.g., during collecting of the bale 24 or idling), the speed of the fan may be decreased, thereby creating less noise. As such, an amount of noise generated by the operation of the fan during use of the bale wagon may be decreased at times when debris is not expected to fall into the engine compartment 54.

In the illustrated embodiment, the shield assembly 60 includes a first shield 84a, a second shield 84b, a third shield 84c, and a fourth shield 84d. Each shield 84 directs the debris to areas away from one or more components of the engine compartment 54, such as the engine 70, to enable the cooling fluid (e.g., air) to contact and cool surfaces of the components of the engine compartment 54. The shields 84 are arranged in a manner that also routes and distributes the cooling fluid within the engine compartment 54 to improve the cooling efficiency of the cooling fluid. For example, when the shield assembly is positioned within the engine compartment 54, ducts 79, 81 are formed to redirect the cooling fluid to one or more regions within the engine compartment. For example, as shown in the illustrated embodiment, the first duct 79 is positioned between at least a portion of the first shield 84a, the second shield 84b, and the third shield 84c. The second duct 81 is defined by the second shield 84b. The ducts 79, 81 are in fluid communication such that the cooling fluid may flow through the engine compartment in a manner that removes the debris on both an intake side and an exhaust side of the engine compartment 54, while also cooling the components within the engine compartment. The hydraulic motor 77 is positioned within the first duct 79 adjacent to the cooling package 62, between shields 84a, 84b, and below shield 84c. Accordingly, the shield 84c reduces an amount of debris that may accumulate onto the hydraulic motor.

Figure 4A:
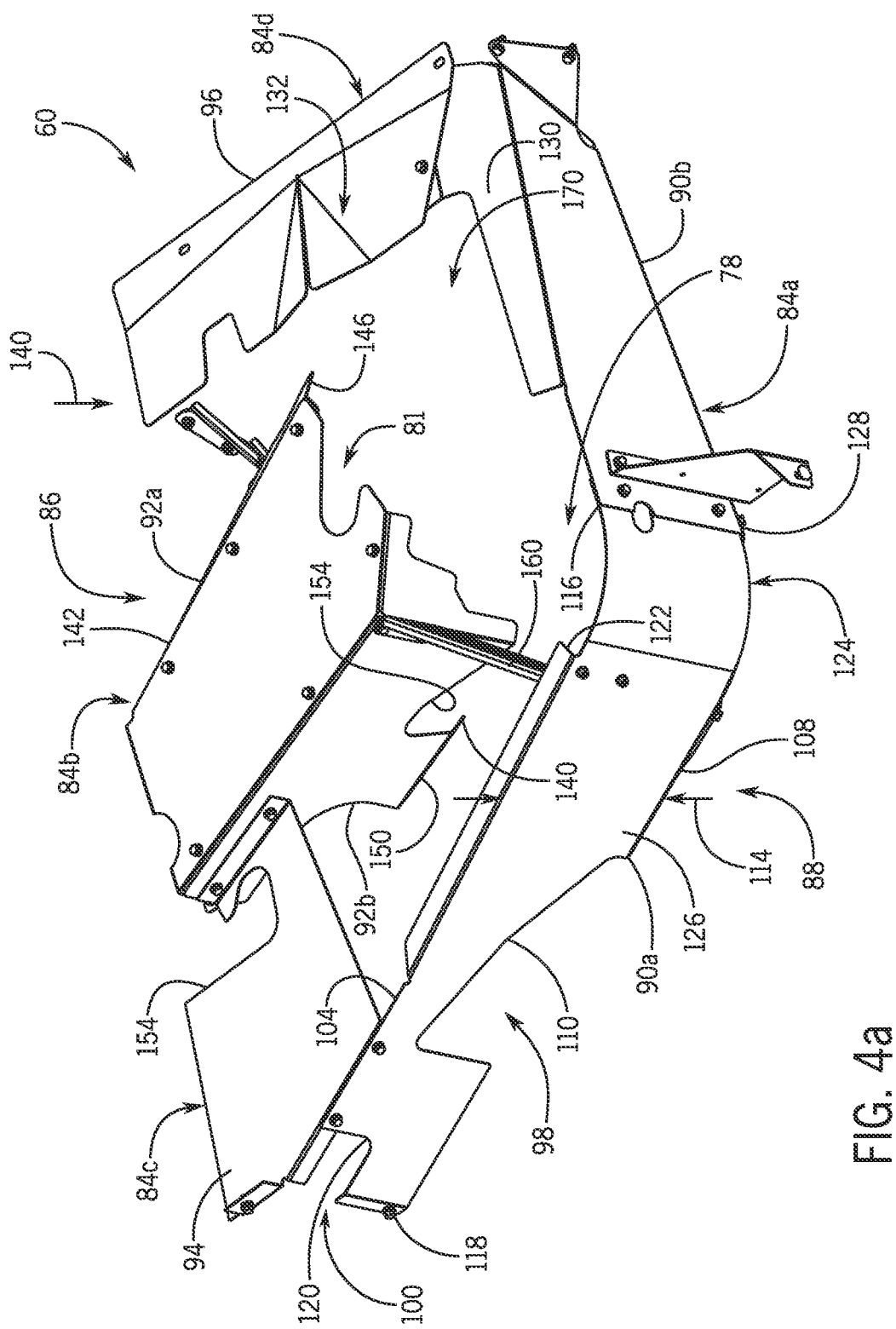
FIG. 4a is a perspective view of a top end of the shield assembly of FIG. 3.

FIGS. 4a, 4b are a top perspective view and a bottom perspective view, respectively, of the shield assembly 60 of FIG. 3. To facilitate discussion of FIGS. 4a, 4b, certain features within the engine compartment 54 have been omitted. In the illustrated embodiment, the shield assembly 60 includes a top side 86 (e.g., side closest and adjacent to the support 26) and a bottom side 88 (e.g., side opposite of the top side 86 and closest to the mobile chassis 12). As discussed above, the shield assembly 60 includes the shields 84, namely first shield 84a, second shield 84b, third shield 84c, and fourth shield 84d. The shields 84 may be manufactured from materials that are durable and heat and corrosion resistance. For example, the shields 84 may be made from materials such as, but not limited to, aluminum, steel, metal alloys, resins, polymers, or any other suitable material and combinations thereof. The shields 84 may be coated with corrosion resistance and/or heat resistance polymers to protect from the elements. By way of non-limiting example, the heat shields 84 may be coated with fiberglass, insulation, foam insulation, or any other suitable heat resistant material.

Each shield 84 is formed from one or more panels 90, 92, 94, and 96 that are arranged in a manner that block debris from accumulating in the engine compartment 54 and that facilitate distribution of the cooling fluid throughout the engine compartment 54 to improve the cooling efficiency of the cooling fluid. For example, in the illustrated embodiment, the first shield 84a includes a first side panel 90a and a second side panel 90b that form a lateral side of the shield assembly 60. The first shield 84a is sized and shaped to fit within and to accommodate certain components of the engine compartment 54 without affecting the configuration and arrangement of the components in the engine compartment 54, as discussed in further detail below. As such, the shield assembly 60 may be retrofit into existing bale wagons to block accumulation of debris from bale handling and to improve the cooling efficiency of the cooling fluid during operation of the bale wagon.

The side panels 90a, 90b are arranged such that the engine, the exhaust pipe, and the at least one of the exhaust systems are partially surrounded by the first shield 84a. The first side panel 90a extends from the cooling package 62 to the exhaust pipe 72, and includes cutouts 98, 100 to accommodate the exhaust system 78 and the coolant lines 80, respectively, and to direct the cooling fluid to flow to the exhaust system 78 for cooling. In the illustrated embodiment, the first shield 84a has a top wall 104 and a bottom wall 108 that is substantially opposite the top wall 104. The first side panel 90a includes a recess 110 positioned midway along the bottom wall 108. The recess 110 is shaped to accommodate the exhaust system 78, thereby forming the cutout 98. Accordingly, a dimension 114 of the first side panel 90a decreases from a first end 116 to a second end 118. In addition, the first side panel 90a includes a recess 120 on the top wall 104 at the second end 118 that forms the cutout 100. In the illustrated embodiment, the first end 116 of the first side panel 90a is curved inward such that the first shield 84a has a rounded corner 124. However, in other embodiments, the first end 116 may not be curved. For example, in one embodiment, the first shield 84a may not have the rounded corner 124. Rather, the first shield 84a may have a sharp corner. In the illustrated embodiment, the first side panel 90a includes a top lip 122 along a portion of the top wall 104. The top lip 122 extends away from an outer surface 126 of the first shield 84a toward the exhaust system 76. The top lip 122 may block debris from spreading into the engine compartment 54 and direct the cooling fluid to desired portions of the engine compartment 54.

The second side panel 90b is coupled to the first end 116 of the first side panel 90a at a coupling end 128. In certain embodiments, a spacer may be used to couple the side panels 90a, 90b to one another. That is, the first shield 84a may include three separate pieces, the first side panel 90a, the second side panel 90b, and a spacer between the side panels 90a, 90b. The second panel 90b is positioned cross-wise to the first side panel 90a resulting in the first shield 84a having an L-shape that surrounds and shields a portion of the engine, the exhaust pipe, and at least one exhaust system. The respective ends 116, 128 of the side panels 90a, 90b, respectively, may be attached via any suitable coupling mechanism. For example, in certain embodiments, the ends 116, 128 may be welded or adhered (e.g., using a suitable adhesive, such as an epoxy resin or the like) to one another. In other embodiments, the respective ends 116, 128 may be coupled to one another using fasteners, such as bolts, nuts, screws, clips, or any other suitable fastener. While in the illustrated embodiment, the first shield 84a is formed using two separate panels 90a, 90b, in certain embodiments, the first shield 84a may be formed from a single panel shaped to surround and shield the engine, the exhaust pipe, and at least one exhaust system along lateral sides of the engine compartment 54.

The second side panel 90b includes features that direct cooling fluid to desired portions of the engine compartment 54. For example, the second side panel 90b includes a second top lip 130 along a portion of the top wall 104. The second top lip 130 extends away from the outer surface 126 of the first shield 84a and toward the engine 70 (or an interior of the engine compartment 54). The second top lip 130 may be sloped away from the engine compartment 54 to allow debris falling from the tables 38, 40, 48 to fall away from the engine compartment 54 and to the ground. In addition to the second top lip 130, the second side panel 90b includes a bottom lip 131 coupled to the bottom wall 108 of the first shield 84a, as shown in FIG. 4b. The bottom lip 131 extends away from the outer surface 126 of the first shield 84a toward the engine 70 and/or interior of the engine compartment 54. The lips 130, 131 direct the cooling fluid within the engine compartment 54 to the desired portions of the engine compartment 54 for cooling. For example, the lips 130, 131 may capture a portion of the cooling fluid exiting the engine compartment 54 and direct the cooling fluid to various regions of the engine compartment 54. In combination, the side panels 90a, 90b of the first shield 84a form a duct (or channel) for directing the cooling fluid to various components of the engine compartment 54 and block/reduce spreading of the debris from bale handling to the engine compartment 54, and redirect cooling fluid to one or more regions of the engine compartment 54. For example, in certain embodiments, the side panels 90a, 90b redirect the cooling fluid to the exhaust manifold 74. However, the side panels 90a, 90b may redirect the cooling fluid to the engine, the exhaust pipe, at least one exhaust system, and/or the hydraulic motor. Moreover, the disclosed shield assembly 60 may enable the cooling fluid to be used for managing accumulation of the debris from the bales 24 by enabling an increase in cooling fluid circulating through the engine compartment 54 during transfer of the bales 24 between the tables 38, 40, 48. The increased circulation of the cooling fluid may blow debris away from the engine compartment 54, thereby blocking spreading and accumulation of the debris within the engine compartment 54.

While the first shield 84a is discussed as having two panels 90a, 90b, the first shield 84a may include any number of panels 90. For example, the first shield 84a may include a third panel coupled to the second panel 90a that may be positioned on a lateral side of the engine compartment opposite the first panel 90a and wrap around a portion of the engine such that the first shield has a U-shape. In certain embodiments, the first shield 84a may include a panel positioned above the at least one of the exhaust systems.

Coupled to the second top lip 130 of the first shield 84a, is the panel 96 of the fourth shield 84d. The fourth shield 84d may catch debris falling between the tables 38, 40, 48 to keep the debris from falling into the engine compartment 54. The panel 96 may include surface features that facilitate a flow of the debris away from the engine compartment 54. For example, as shown in FIG. 4a, the panel 96 includes a sloped portion 132. The sloped portion 132 directs debris dropping from the tables 38, 48, 48 away from the engine compartment 54. FIG. 5 is a cross-sectional side view of a portion of the fourth shield 84d illustrating the sloped portion 132. In the illustrated embodiment, the sloped portion 132 includes a first sloped surface 134 oriented at an angle 138 relative to a surface 139 of the panel 96 in a first direction and a second sloped surface 136 oriented at the angle 138 relative to the surface 139 in a direction opposite the first direction. The sloped surfaces 134, 136 form a bend in the panel 96 that keeps the debris dropping from the tables 38, 30, 48 from falling into the engine compartment 54. The fourth shield 84d may include additional panels arranged in a manner that blocks/reduces accumulation of debris within the engine compartment.

The second shield 84b may also be used to block the debris from falling into the engine compartment 54 during bale handling. In addition to blocking the debris, the second shield 84b may also capture portions of the cooling fluid and direct the cooling fluid to desired regions of the engine compartment 54. The second shield 84b is positioned between the engine 70 and the cooling package 62. As illustrated in FIG. 4, the second shield 84b includes a top panel 92a and a side panel 92b coupled to and positioned cross-wise to the top panel 92a. The second shield 84b may include additional panels arranged to reduce accumulation of debris within the engine compartment and facilitate a flow of the cooling air to desired regions of the engine compartment. The top panel 92a may be used to capture cooling fluid that may be blown out of the engine compartment 54, and the side panel 92b redirects the captured cooling fluid to one or more regions of the engine compartment 54, such as, for example, the exhaust pipe 72. The top panel 92a may be sloped in a manner that directs debris from bale handling away from the engine 70. For example, the top panel 92a may be sloped in a downward direction 140 such that any debris that may fall onto the top panel 92a may flow off the second shield 84b along an edge 142 to the ground and away from the engine 70 and other components of the engine compartment 54.

As shown in FIG. 4b, the top panel 92a includes a top lip 146 along the edge 142. The top lip 146 may be slanted relative to the top panel 92a such that the debris that may spread onto the top panel 92a may be directed away from the engine compartment 54 when flowing off the top panel 92a through the edge 142. Similar to the top panel 92a, the side panel 92b includes a bottom lip 148 along a portion of a bottom wall 150 of the second shield 84b. The bottom lip 148 may facilitate redirection of the captured cooling fluid to desired regions of the engine compartment 54. In addition to the bottom lip 148, the side panel 92b of the second shield 84b includes a recess 154 that forms a cutout to accommodate components of the engine compartment 54.

Similar to the second shield 84b, the third shield 84c captures cooling fluid that may otherwise exit the engine compartment 54. The third shield 84c includes the panel 94, which is coupled to and positioned cross-wise to the panels 90a, 92b. That is, the panel 94 is positioned horizontally along a top portion of the engine compartment 54 such that debris from the bales 24 falling from the tables 38, 40, 48 do not spread into the engine compartment 54, and cooling fluid from the cooling fan package 62 does not escape the engine compartment 54 prematurely. The third shield 84c is positioned adjacent to and is in contact with an inward facing surface of the cooling fan package 62. The panel 94 may include a recess 154 (e.g., a cutout) that allows the cooling fluid from the cooling fan package 62 to be blown into the engine compartment 54. In certain embodiments, the third shield 84c includes a sloped surface that directs the debris away from the engine compartment.

The shield assembly 60 includes shield mounting structures that facilitate assembly and coupling of the shields 84 to form the shield assembly 60. Returning to FIGS. 4a, 4b, the shield assembly 60 includes shield mounting supports 160 positioned between certain shields 84. For example, in the illustrated embodiment, shield mounting support 160a is positioned between the shields 84a, 84b and coupled to the side panels 90a, 92b of the respective shields 84a, 84b. Similarly, shield mounting support 160b is positioned between the shields 84b, 84d and coupled to the panels 92a, 96. Additional shield mounting support 160 may be positioned at various sections of the shield assembly 60 to provide facilitate assembly of the shield assembly 60. The shield mounting support 160 may include openings 164 to allow the cooling fluid to flow through the shield assembly 60 and the engine compartment 54. The panels 90, 92, 94, 96 and the shield mounting support 160 may be assembled using any suitable fastener, such as, but not limited to, screws, bolts, nuts, or the like, and combinations thereof.

In certain embodiments, certain portions of the shield assembly 60 may include a heat shield to reduce heat flow to certain components within the engine compartment 54. For example, in one embodiment, the first shield 84a may include the heat shield to improve the cooling efficiency of the cooling fluid. Additionally, the heat shield on the shield assembly 60 may reduce heat flow from the engine 70 to external environment during operation to reduce the temperature of sensitive components outside of the engine compartment 54. By way of non-limiting example, the heat shield may include fiberglass, insulation, foam insulation, a pressure sensitive adhesive, acrylic adhesives, or any other suitable material.

In addition to the heat shield, the shields 84 of the shield assembly 60 are arranged in a manner that forms a top opening 170 (e.g., at a side of engine compartment 54 that is farthest away from the mobile chassis and is closest to the support). The top opening 170 enables heat generated by the engine 70 during operation of the bale wagon 10 to dissipate. Moreover, the top opening 170 facilitates cleaning of the engine compartment 54 after use of the bale wagon 10. For example, the top opening 170 enables an operator to supply compressed air to the engine compartment 54 to clean and remove dust and other particulates that may remain within the engine compartment 54 after use of the bale wagon 10.

The embodiments described herein may provide the technical benefit of improving debris management within a bale wagon during collecting, loading, and transferring of bales. More specifically, the bale wagon may include a shield assembly positioned within an engine compartment that blocks/reduces accumulation of the debris within the engine compartment. Additionally, the shield assembly may redirect cooling fluid (e.g., air) to one or more regions of the engine compartment to cool components within the engine compartment and improve the cooling efficiency of the cooling fluid by removing debris.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A shield assembly configured to be disposed within an engine compartment of an agricultural vehicle, wherein the shield assembly comprises:
 a plurality of shields configured to block buildup of debris within the engine compartment, wherein at least one shield of the plurality of shields comprises a sloped surface configured to direct debris away from the engine compartment; and
 a plurality of ducts formed by the plurality of shields, wherein the plurality of ducts is configured to direct cooling fluid from a cooling fan of a cooling fan package to an engine within the engine compartment to remove debris from within the engine compartment;
 wherein the plurality of shields comprises a first shield configured to be disposed on a lateral side of the engine compartment and arranged partially around the engine and an exhaust pipe, and the first shield comprises a first panel and a second panel coupled to and positioned cross-wise to the first panel;
 wherein the plurality of shields comprises a second shield separate and spaced apart from the first shield and configured to be disposed adjacent to the engine and the cooling fan package, the second shield comprises a third panel and a fourth panel coupled to and oriented cross-wise to the third panel, at least a portion of the third panel is arranged parallel to the first panel, and the fourth panel is configured to be positioned above the engine compartment; and
 wherein the plurality of shields comprises a third shield disposed between the first panel and the third panel, the third shield is configured to be positioned above the engine compartment and adjacent to the cooling fan package.

2. The shield assembly of claim 1, wherein a first duct of the plurality of ducts is formed by the first shield and the second shield.

3. The shield assembly of claim 2, wherein a second duct of the plurality of ducts is formed by the third panel and the fourth panel of the second shield, and the first duct and the second duct are in fluid communication.

4. The shield assembly of claim 1, wherein the plurality of shields comprises a fourth shield coupled to the first shield and configured to be positioned above the engine.

5. The shield assembly of claim 4, wherein the fourth shield has the sloped surface.

6. The shield assembly of claim 1, wherein the first panel comprises one or more openings configured to channel the cooling fluid to flow between shielded and unshielded portions of the engine compartment, and at least a portion of an exhaust system is configured to be positioned within the opening.

7. The shield assembly of claim 1, wherein the shield assembly comprises one or more shield mounting supports couple to at least two shields of the plurality of shields to form the shield assembly.

8. The shield assembly of claim 1, wherein at least one shield of the plurality of shields comprises a first lip and a second lip spaced apart from the first lip, and the first lip and the second lip are disposed on an upper wall of the at least one shield of the plurality of shields and configured to be oriented toward the engine compartment.

9. The shield assembly of claim 8, wherein the second lip has the sloped surface.

10. The shield assembly of claim 1, wherein the shield assembly comprises an opening at a top end, and the opening is configured to facilitate dissipation of heat generated within the engine compartment.

11. A shield assembly configured to be disposed within an engine compartment of an agricultural vehicle, wherein the shield assembly comprises:
 a plurality of shields configured to block buildup of debris within the engine compartment, wherein at least one shield of the plurality of shields comprises a sloped surface configured to direct debris away from the engine compartment; and
 a plurality of ducts formed by the plurality of shields, wherein the plurality of ducts is configured to direct cooling fluid from a cooling fan of a cooling fan package to an engine within the engine compartment to remove debris from within the engine compartment;

wherein the plurality of shields comprises:
a first shield configured to be disposed on a lateral side of the engine compartment and arranged partially around the engine and an exhaust pipe disposed within the engine compartment;
a second shield separate from and spaced apart from the first shield and configured to be disposed adjacent to the engine and the cooling fan package;
a third shield disposed between and coupled to the first shield and the second shield, wherein the third shield is positioned cross-wise to the first shield and configured to be positioned above the engine compartment and adjacent to the cooling fan package; and
a fourth shield coupled to the first shield and positioned above the first shield, wherein the fourth shield is configured to be positioned above the engine.

12. The shield assembly of claim 11, wherein the sloped surface is formed on a portion of the fourth shield, and the sloped surface is sloped in a direction away from the engine compartment when the fourth shield is positioned above the engine compartment to direct debris away from the engine compartment.

13. The shield assembly of claim 12, wherein the portion of the fourth shield comprises a second sloped surface, and the sloped surface and the second sloped surface form a bend in the fourth shield.

14. The shield assembly of claim 11, comprising one or more shield supporting structures disposed between and coupled to the first shield and the second shield, the second shield and the fourth shield, or both.

15. The shield assembly of claim 11, wherein a first duct of the plurality of ducts is formed by at least a portion of the first shield, the second shield, and the third shield, a second duct of the plurality of ducts is formed by the second shield, and the second duct is positioned adjacent to and in fluid communication with the first duct.

16. A shield assembly configured to be disposed within an engine compartment of an agricultural vehicle, wherein the shield assembly comprises:
a plurality of shields configured to block buildup of debris within the engine compartment; and
a plurality of ducts formed by the plurality of shields, wherein the plurality of ducts is configured to direct cooling fluid from a cooling fan of a cooling fan package to an engine within the engine compartment to remove debris from within the engine compartment;
wherein the plurality of shields comprises:
a first shield configured to be disposed on a lateral side of the engine compartment and arranged partially around the engine and an exhaust pipe disposed within the engine compartment;
a second shield separate from and spaced apart from the first shield and configured to be disposed adjacent to the engine and the cooling fan package;
a third shield disposed between and coupled to the first shield and the second shield, wherein the third shield is positioned cross-wise to the first shield and configured to be positioned above the engine compartment and adjacent to the cooling fan package; and
a fourth shield coupled to the first shield and positioned above the first shield, wherein the fourth shield is configured to be positioned above the engine.

17. The shield assembly of claim 16, comprising one or more shield supporting structures disposed between and coupled to the first shield and the second shield, the second shield and the fourth shield, or both.

18. The shield assembly of claim 16, wherein a first duct of the plurality of ducts is formed by at least a portion of the first shield, the second shield, and the third shield, a second duct of the plurality of ducts is formed by the second shield, and the second duct is positioned adjacent to and in fluid communication with the first duct.

19. The shield assembly of claim 16, wherein at least one shield of the plurality of shields comprises a first lip and a second lip spaced apart from the first lip, and the first lip and the second lip are disposed on an upper wall of the at least one shield of the plurality of shields and configured to be oriented toward the engine compartment.

20. The shield assembly of claim 16, wherein the shield assembly comprises an opening at a top end, and the opening is configured to facilitate dissipation of heat generated within the engine compartment.

* * * * *